US006539166B2

(12) United States Patent
Kawamura et al.

(10) Patent No.: US 6,539,166 B2
(45) Date of Patent: *Mar. 25, 2003

(54) DATA MULTIPLEXER, DATA MULTIPLEXING METHOD, DATA RECORDING MEDIUM, DATA RECORDER, DATA DEMULTIPLEXER AND DATA DEMULTIPLEXING METHOD

(75) Inventors: Makoto Kawamura, Kanagawa (JP); Yasushi Fujinami, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/264,517

(22) Filed: Mar. 8, 1999

(65) Prior Publication Data

US 2001/0005447 A1 Jun. 28, 2001

Related U.S. Application Data

(63) Continuation of application No. 08/586,158, filed on Jan. 17, 1996, now abandoned.

(30) Foreign Application Priority Data

Jan. 20, 1995 (JP) ............................ 07-006902

(51) Int. Cl.[7] ................................. H04R 5/91

(52) U.S. Cl. ........................... 386/95; 386/98; 386/125

(58) Field of Search ............................. 386/46, 95, 98, 386/111, 112, 125, 126, 83; 348/468, 478; H04N 5/76, 7/08

(56) References Cited

U.S. PATENT DOCUMENTS 5,337,157 A    8/1994   Shingo
5,375,160 A    12/1994   Guidon et al.

(List continued on next page.)

FOREIGN PATENT DOCUMENTS

EP    0 610 864    8/1994
WO   WO 94 07332    3/1994

(List continued on next page.)

OTHER PUBLICATIONS

Zdepski J et al., "Overview of the Grand Alliance HDTV Video Compression System", Record of the Asilomar conference on signals, systems and computers, US, Los Alamitos, IEEE comp. Soc. Press, vol. CONF. 28 (Oct. 30, 1994) pp. 193–197.

(List continued on next page.)

*Primary Examiner*—Huy Nguyen
(74) *Attorney, Agent, or Firm*—Frommer Lawrence & Haug LLP; William S. Frommer; Dennis M. Smid

(57) ABSTRACT

A data multiplexer for multiplexing at least digital moving picture data and pattern data (character data) comprises a packetizing means for forming the digital moving picture data and the pattern data into PES packets of a predetermined format based on the MPEG-2 standard, each packet consisting of a header and an actual data region; an adding means for adding, to the header of each packet, a flag to identify the moving picture data and the pattern data; and a means for multiplexing the packets. An ID flag recorded in the header of each PES packet serves to identify a video packet, an audio packet or a pattern data packet. Each packet of the pattern data and the digital moving picture data includes a time stamp indicative of decode or display timing. In this data multiplexer, the pattern data (character data) on any horizontal scanning line can be multiplexed and recorded with the digital moving picture data.

5 Claims, 13 Drawing Sheets

U.S. PATENT DOCUMENTS 5,455,684 A * 10/1995 Fujinami et al. ............. 386/111
5,543,852 A *  8/1996 Yuen et al. .................. 348/478
5,742,352 A *  4/1998 Tsukagoshi ................. 348/468
5,745,184 A *  4/1998 Neal .......................... 348/468

FOREIGN PATENT DOCUMENTS

| WO | WO 94 17633 | | 8/1994 | |
| WO | 94/17633 | * | 8/1994 | ............ H04N/7/08 |

OTHER PUBLICATIONS

National Associatiion of Broadcasters (NAB): "Grand Alliance HDTV System Specification. Passage text", Proceedings of the Annual Broadcast Engineering Conference, US, NAB, vol. Conf. 48 (Feb. 2, 1994) pp. A, I–III, 1–6.
"Annex H—Private Data" CH, Geneva, ISO–IEC 13818–1 : DIS (1994) pp. 112–113.

* cited by examiner

FIG. 3

Stream_id assignments

| Stream id | Note | Stream coding |
|---|---|---|
| 1011 1100 | 1 | Program_stream_map |
| 1011 1101 | 2 | Private_stream_1 |
| 1011 1110 |  | Padding_stream |
| 1011 1111 | 3 | Private_stream_2 |
| 110x xxxx |  | ISO/IEC 13818-3 or ISO/IEC 11172-3 audio stream number x xxxx |
| 1110 xxxx |  | ITU-T Rec. H.262\|ISO/IEC 13818-2 or ISO/IEC 11172-2 video stream number xxxx |
| 1111 0000 | 3 | ECM_stream |
| 1111 0001 | 3 | EMM_stream |
| 1111 0010 | 5 | ITU-T Rec. H.222.0\|ISO/IEC 13818-1 Annex A or ISO/IEC 13818-6_DSMCC_stream |
| 1111 0011 | 2 | ISO/IEC_13522_stream |
| 1111 0100 | 6 | ITU-T Rec. H.222.1 type A |
| 1111 0101 | 6 | ITU-T Rec. H.222.1 type B |
| 1111 0110 | 6 | ITU-T Rec. H.222.1 type C |
| 1111 0111 | 6 | ITU-T Rec. H.222.1 type D |
| 1111 1000 | 6 | ITU-T Rec. H.222.1 type E |
| 1111 1001 | 7 | ancillary_stream |
| 1111 1010 ~ 1111 1110 |  | reserved data stream |
| 1111 1111 | 4 | program_stream_directory |

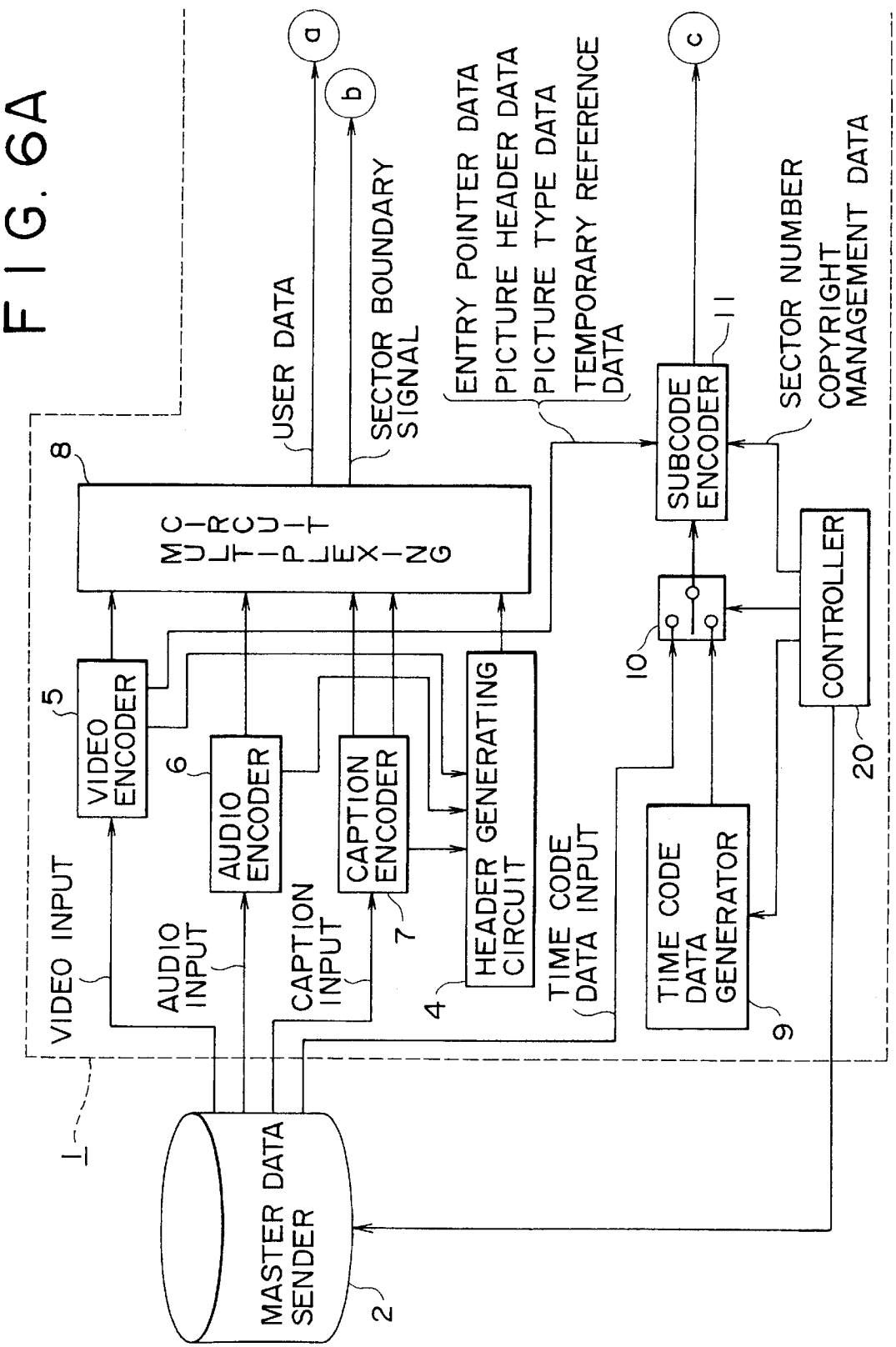

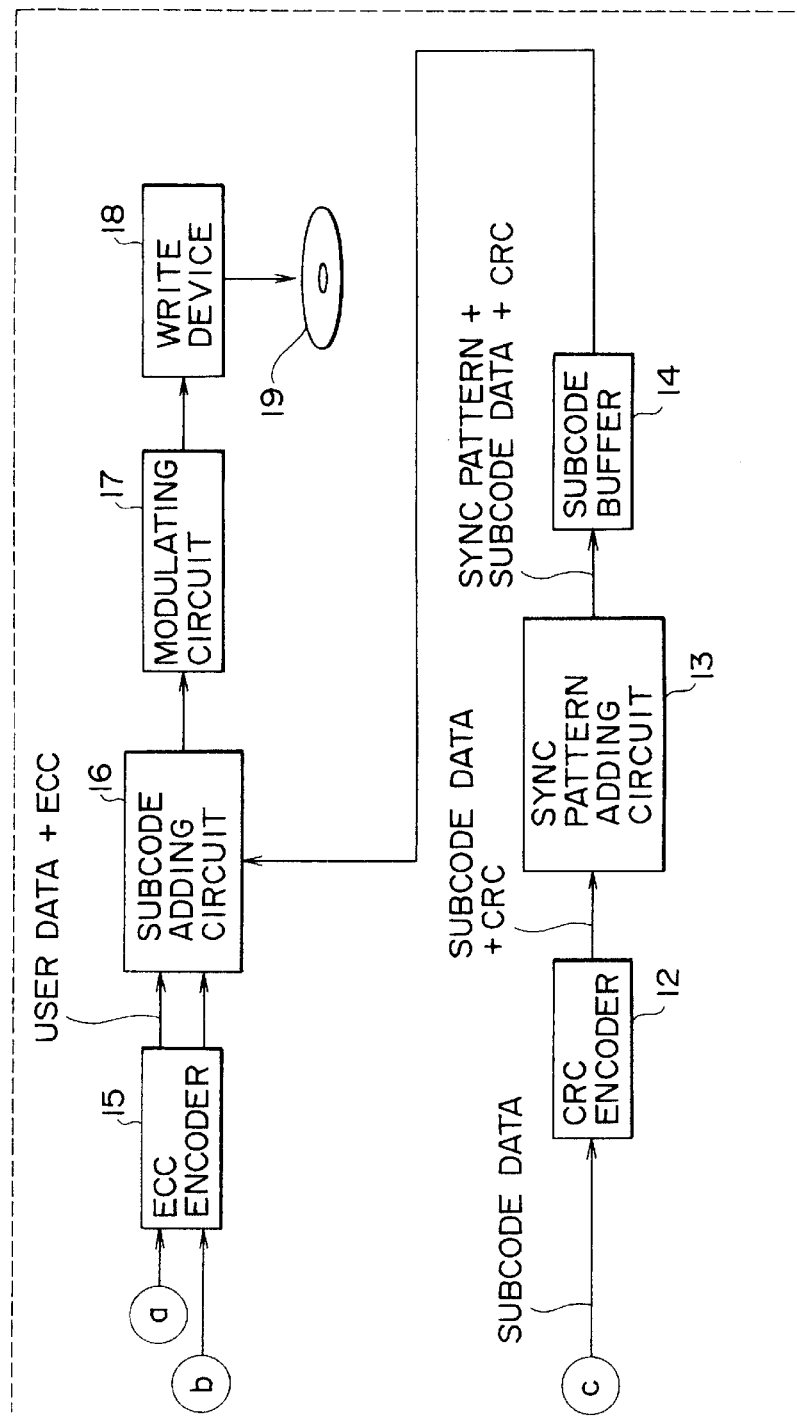

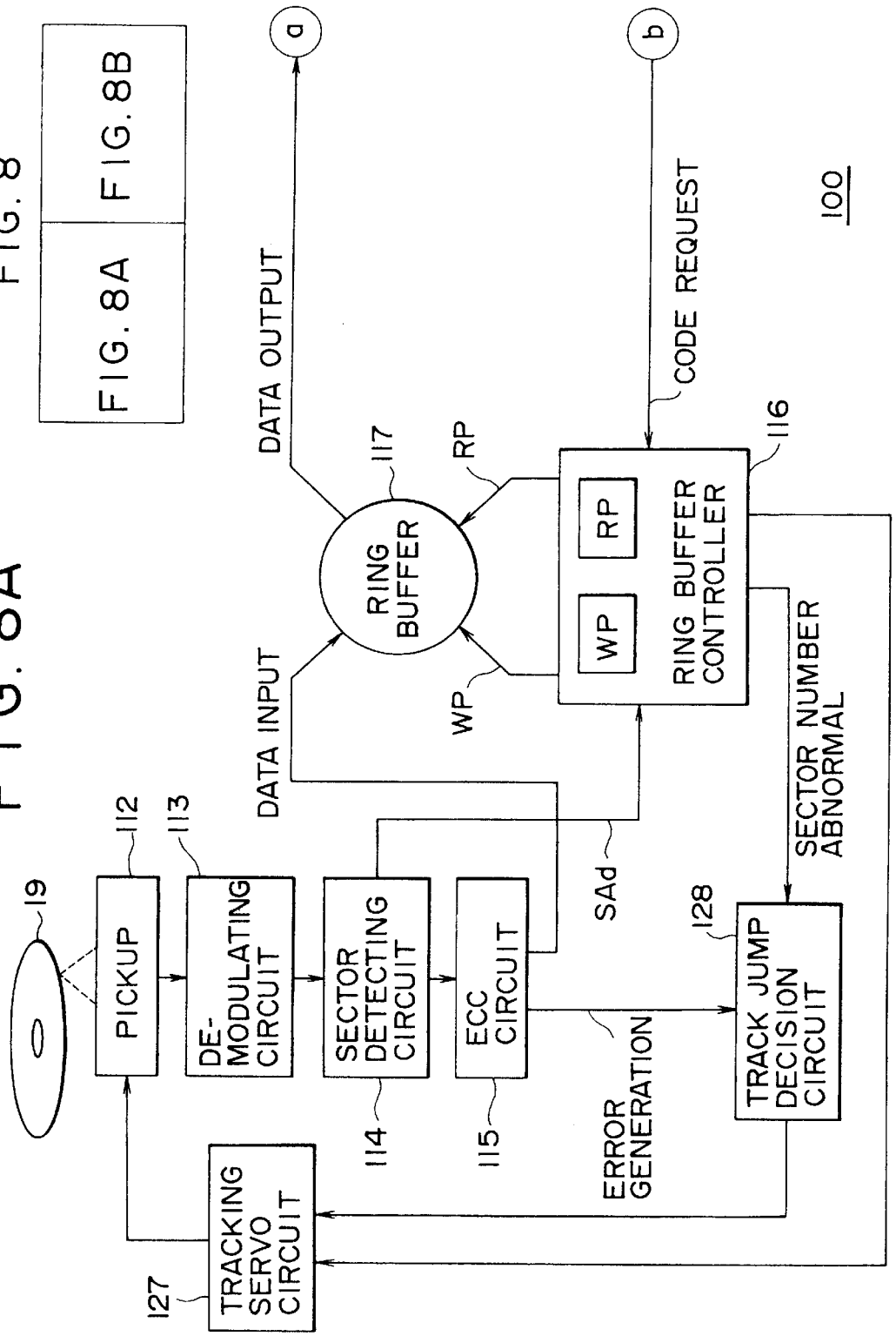

ODD FIELD

EVEN FIELD

DATA MULTIPLEXER, DATA MULTIPLEXING METHOD, DATA RECORDING MEDIUM, DATA RECORDER, DATA DEMULTIPLEXER AND DATA DEMULTIPLEXING METHOD

This is a continuation application of application Ser. No. 08/586,158 filed on Jan. 17, 1996, now abandoned.

BACKGROUND OF THE INVENTION

1. Field of the Invention

The present invention relates to a data multiplexer, a data multiplexing method, a data recording medium, a data recorder, a data demultiplexer and a data demultiplexing method which are adapted for use in recording, for example, digital video data with character data on a disk and reproducing such data therefrom.

2. Description of the Related Art

A television image on a screen is composed of a plurality of horizontal scanning lines. In the case of the NTSC system for example, one frame of image is composed of 525 horizontal scanning lines. Since an interlaced scanning process is adopted in the NTSC system, one frame is composed of an odd-field image and an even-field image.

Horizontal scanning lines are sequentially scanned from the uppermost left toward the lowermost right and, upon arrival of the horizontal scanning at the right end of the screen, it needs to be returned to the left end of the screen. And when the horizontal scanning has reached the lowermost end of the screen, it needs to be returned to the uppermost end. Therefore, a blanking interval is generated for returning the horizontal scanning in both horizontal and vertical directions. Consequently, on each of odd-field and even-field images as shown in FIG. 9, an area (effective area) usable substantially for display of a picture is rendered narrower than the area actually scanned.

For this reason, when video signals are digitized and recorded on a recording medium, merely the data of the effective area is encoded so as to reduce the amount to be encoded. For example, in an odd field as shown in FIG. 9A, a total of 240 horizontal scanning lines from the 21st to 260th are used as effective lines, while in an even field as shown in FIG. 9B, a total of 240 horizontal scanning lines from the 284th to 523rd are used as effective lines, and only the video signals of such effective lines are encoded.

FIG. 10 illustrates effective lines as an area in signals which change with a lapse of time. As shown in the diagram, an FID signal representing odd and even fields is inverted at each generation of a vertical synchronizing signal (VSYNC). And in an odd field, 240 lines (H) from the 21st to 260th lines (H) are used as effective ones, while in an even field, 240 lines (H) from the 284th to 523rd lines (H) are used as effective ones.

In transmitting such video signals, there is executed a process of superimposing character data or the like on a predetermined horizontal scanning line in a blanking area in a manner not to affect the essential picture of the effective area of the video signals. Regarding this technique, there are known CAPTAIN (Character and Pattern Telephone Access Information Network) system in Japan, teletext system in Europe, and closed caption system and EDS (Extended Data Services) in the United States.

The character data include characters such as alphabetic letters and numerals, and also a mosaic bit map used in the CAPTAIN system for example. Hereinafter such data will be termed pattern data.

For example, it is so prescribed that pattern data (caption data) is to be recorded on 21st H in the closed caption system, or on 21st H in an odd field and on 284th H in an even field in the EDS, respectively.

When data in the EDS for example is recorded by a helical-scanning video tape recorder, the recording state thereof is such as shown in FIG. 11. In this case, as illustrated, both 21st and 284th H, on which the pattern data is recorded, are recorded on the tape.

Therefore, in an operation of reproducing the video signal recorded on such a video tape and recording the reproduced signal on a disk after encoding the signal in accordance with a video CD standard based on the MPEG (Moving Pictures Expert Group)-1, the pattern data also is digitally recordable on the disk as well as the essential video data since, in the video CD standard, the effective lines for recording the pattern data are from 21st H to 260th H in an odd field and from 284th H to 523rd H in an even field.

In the video CD standard which is an application of the MPEG-1, effective lines are so prescribed as to include pattern-data insertion lines in both the closed caption and the EDS, whereby the pattern data is recordable on a disk. However, there exists a problem that, if the pattern data is inserted in any blanking interval anterior to the 21st H or in any blanking interval anterior to the 284th H, the pattern data is rendered unrecordable on the disk.

The present applicant proposed a contrivance in, e.g., Japanese Patent Application No. Hei 6-54706 relative to a technique of recording a video signal digitally on a disk in accordance with the MPEG-2 standard. In this prior proposal, unrequired data (pattern data) other than the essential video data is not recorded so as to achieve a superior picture quality in recording and reproducing the video data. More specifically, the 21st and 284th H are not recorded, and effective lines in an odd field are 240 H ranging from the 22nd to 261st H, while those in an even field are 240 H ranging from the 285th to 524th H.

Thus, in order to attain a superior picture quality, it is necessary to prepare a separate means to record pattern data.

SUMMARY OF THE INVENTION

The present invention has been accomplished in view of the circumstances mentioned above. It is therefore an object of the invention to realize proper recording and reproduction of even pattern data inserted on horizontal scanning lines at any positions. And another object of the invention resides in enabling exact recording and reproduction of pattern data without deteriorating the picture quality in comparison with the means employed in the video CD standard which is based on the MPEG-1.

According to a first aspect of the present invention, there is provided a data multiplexer for multiplexing at least digital moving picture data and pattern data. The data multiplexer comprises a packetizing means for forming the digital moving picture data and the pattern data into packets of a predetermined format, each packet consisting of a header and an actual data region; an adding means for adding, to the header of each packet, a flag to identify the moving picture data and the pattern data; and a multiplexing means for multiplexing the packets.

The pattern data is disposed in a vertical blanking period. In the NTSC system, the pattern data in each odd field may be character data disposed on the 21st horizontal scanning line, and the digital moving picture data in each odd field may be composed of a predetermined number of horizontal scanning lines after the 22nd line.

Also in the NTSC system, the pattern data in each even field may be character data disposed on the 284th horizontal scanning line, and the digital moving picture data in each even field may be composed of a predetermined number of horizontal scanning lines after the 285th line.

A packet of the pattern data and a packet of the digital moving picture data include, respectively, a time stamp indicative of decode or display timing.

A packet of the pattern data is prescribed by Private_stream_1 in the MPEG-2 system.

Pattern data on one, two or more horizontal scanning lines is described in one packet of the pattern data.

According to a second aspect of the present invention, there is provided a data recorder which comprises the data multiplexer mentioned above, and a recording means for recording, on a recording medium, the data multiplexed by the data multiplexer.

According to a third aspect of the present invention, there is provided a data multiplexing method which multiplexes at least digital motion picture data and pattern data. This method comprises the steps of: forming the digital moving picture data and the pattern data into packets of a predetermined format, each packet consisting of a header and an actual data region; adding, to the header of each packet, a flag to identify the moving picture data and the pattern data; and multiplexing the packets.

According to a fourth aspect of the present invention, there is provided a data recording medium where at least digital moving picture data and pattern data are multiplexed and recorded. In this recording medium, the digital moving picture data and the pattern data are formed into packets in a predetermined format, each packet consisting of a header and an actual data region; and a flag for identifying the moving picture data and the pattern data is added to the header of each packet; and the packets are multiplexed and recorded.

According to a fifth aspect of the present invention, there is provided a data demultiplexer for separating multiplexed data of at least packetized digital moving picture data and pattern data. This data demultiplexer comprises a detecting means for detecting a flag to identify the digital moving picture data and the pattern data from the packet thereof; a separating means for mutually separating the digital moving picture data and the pattern data in accordance with the flag detected by the detecting means; a moving picture data decoding means for decoding the moving picture data separated by the separating means; and a pattern data decoding means for decoding the pattern data separated by the separating means.

The data demultiplexer further comprises a time stamp detecting means for detecting a time stamp which indicates the timing to decode or display the digital moving picture data or the pattern data; and a control means for synchronously controlling the moving picture data decoding means and the pattern data decoding means in accordance with the time stamp detected by the time stamp detecting means.

The data demultiplexer further comprises an adding means for adding, as a signal of a different horizontal scanning line, the signal decoded by the pattern data decoding means to the signal decoded by the moving picture data decoding means.

And according to a sixth aspect of the present invention, there is provided a data demultiplexing method for separating multiplexed data of at least packetized digital moving picture data and pattern data. This data demultiplexing method comprises the steps of: detecting a flag to identify the digital moving picture data and the pattern data from the packet thereof, and also detecting a time stamp which indicates the timing to decode or display the digital moving picture data or the pattern data; mutually separating the digital moving picture data and the pattern data in accordance with the detected flag; and decoding the moving picture data and the pattern data thus separated.

In the data multiplexer and the data multiplexing method of the present invention, digital moving picture data and pattern data are formed into packets of a predetermined format, and a flag for identifying the moving picture data and the pattern data is added to the header of each packet. Therefore the pattern data inserted in a position on an arbitrary horizontal scanning line can be multiplexed with the moving picture data.

In the data recorder and the data recording medium of the present invention, the packetized moving picture data and pattern data of a predetermined format are recorded on the data recording medium with addition of a flag which identifies such data. Accordingly, the pattern data inserted on an arbitrary horizontal scanning line can be multiplexed and recorded with the moving picture data.

In the data demultiplexer and the data demultiplexing method of the present invention, the digital moving picture data and the pattern data are mutually separated in accordance with the detected flag. Therefore the digital moving picture data and the pattern data can be exactly decoded and displayed with certainty.

The above and other features and advantages of the present invention will become apparent from the following description which will be given with reference to the illustrative accompanying drawings.

BRIEF DESCRIPTION OF THE DRAWINGS

FIG. 3 is an explanatory diagram of stream ID;

FIG. 6 is a block diagram showing an exemplary constitution of a data recorder where a data multiplexer of the invention is applied;

DESCRIPTION OF THE PREFERRED EMBODIMENTS

The present invention encodes video data and pattern data in accordance with the MPEG standard, then multiplexes and records the encoded data on a recording medium and reproduces the recorded data therefrom. The MPEG standard is prescribed as follows.
MPEG-1 system: ISO11172-1
MPEG-1 video: ISO11172-2
MPEG-1 audio: ISO11172-3
MPEG-2 system: ISO13818-1
MPEG-2 video: ISO13818-2
MPEG-2 audio: ISO13818-3

Figure 1:
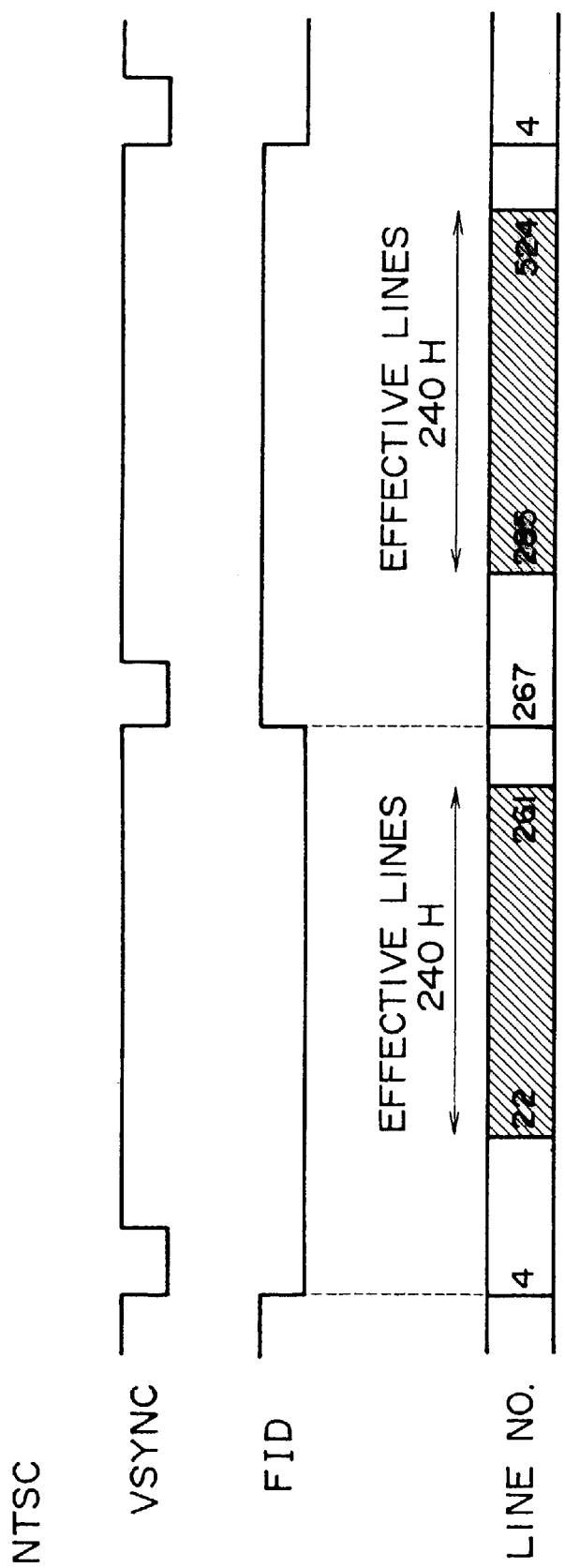
FIG. 1 is a schematic diagram for explaining effective lines in the present invention.

FIG. 1 illustrates effective lines in the present invention. In this embodiment related to the NTSC system, as shown in the diagram, 240 H ranging from 22nd to 261st H in an odd field are used as effective lines, and 240 H ranging from 285th to 524th H in an even field are used as effective lines. As will be described later, when video data is digitized and recorded on a data recording medium 19 (disk), merely the video signal on such effective lines alone is encoded, so that the number of effective lines is rendered equal to that in the video CD standard which is an application of the aforementioned MPEG-1, whereby desired interchangeability can be ensured.

In this case, however, it becomes impossible to record the pattern data inserted in , e.g., the 21st H in an odd field or the 284th H in an even field, as described earlier. In this embodiment, therefore, the video data, the audio data and the pattern data (character data) are formed respectively into a PES (Packetized Elementary Stream) packet and (video packet, audio packet, private_stream_type 1 packet) in conformity with the format prescribed in the MPEG-2 system.

Figure 2:
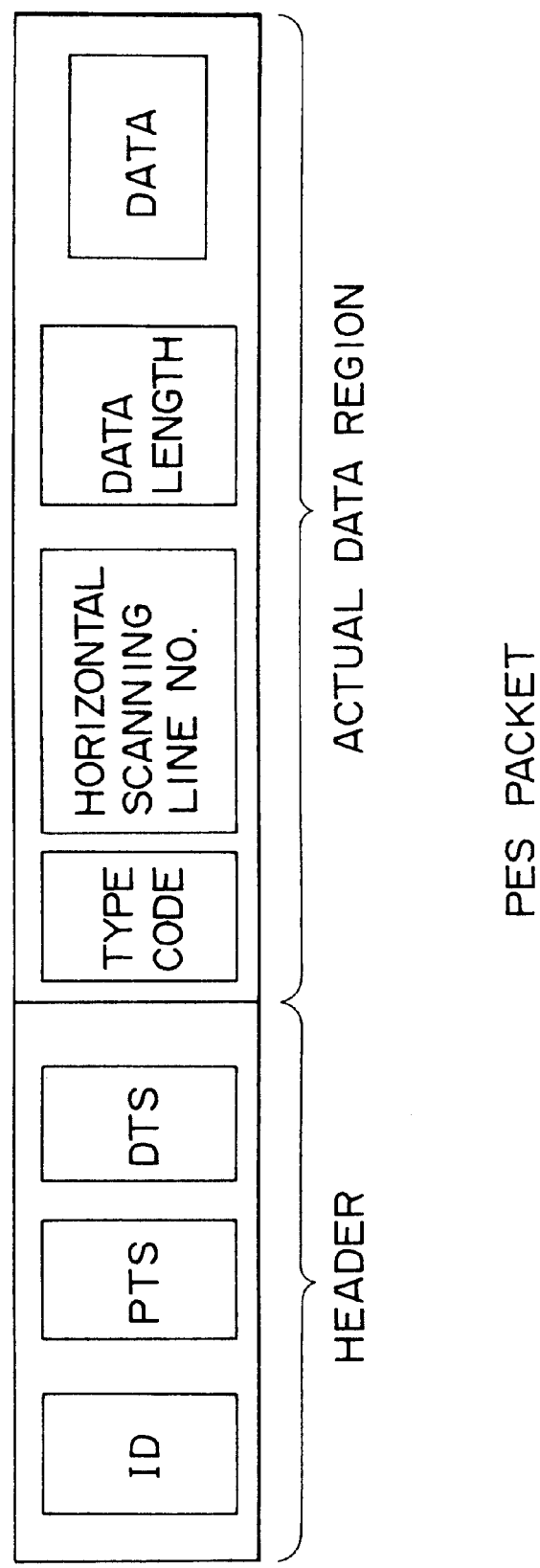
FIG. 2 shows a format of a PES packet for recording pattern data in the invention.

A PES packet consists of a header and an actual data region. In the header, as prescribed in the MPEG-2 system, there are disposed an ID (stream-id), a PTS (Presentation Time Stamp) and a DTS (Decoding Time Stamp). In the actual data region, video data is disposed in the case of a video packet, or audio data is disposed in the case of an audio packet. And in the case of a pattern data packet, as shown in FIG. 2, there are disposed a type code, a horizontal scanning line number, a data length and data.

In the ID is described a number (ID) which indicates that the relevant packet is a video packet, an audio packet or a pattern data packet. In the MPEG-2 system, the number described here is so prescribed as shown in FIG. 3. That is, the above number is coded as 1110xxxx in a video packet, or as 110xxxxx in an audio packet, or as 10111101 in a pattern data packet. More specifically, in the MPEG-2 system, the pattern data is formed into a packet prescribed as Private_stream_1.

A PTS is a time stamp (time information) indicative of the timing of presentation, and the DTS is a time stamp indicative of the timing of decode. In this embodiment, the PTS and the DTS are mutually equivalent since a delay from decode to presentation is zero.

A type code in the actual data region of a pattern data packet is used for identifying, e.g., closed caption, EDS, CAPTAIN or teletext. This code is composed of 4 bits for example.

A horizontal scanning line number indicates the position of the horizontal scanning line where the pattern data is inserted. In the closed caption system, this number is 21. Meanwhile in the EDS, this number is 21 in an odd field, or 284 in an even field. Considering use in the PAL system, 8 bits are insufficient for a horizontal scanning line number, and therefore this number is composed of 16 bits for example. Pattern data (character data) can be inserted in a horizontal scanning line at an arbitrary position by setting the horizontal scanning line number to an arbitrary value.

However, when a restriction is added not to present any pattern (character) in the effective area, the horizontal scanning line number may be composed of 8 bits for example, and it is possible to describe that any of the horizontal scanning numbers from 1st to 64th H is indicated by 6 low-order bits including LSB, while a distinction is made by 2 high-order bits including MSB as to whether the relevant horizontal scanning line number is the one counted from the upper end or the lower end.

The data length signifies the length of the succeeding data. Although different depending on the type of the pattern data, the data length may be composed of 2 bytes in the case of, e.g., a closed caption in the United States. In a CAPTAIN pattern for example, it is preferred that more bits be ensured to represent the data length.

The data signifies character data to be presented. In an example where one character is recorded per frame, it follows that a total of 30 characters can be recorded and reproduced per second.

Figure 4:
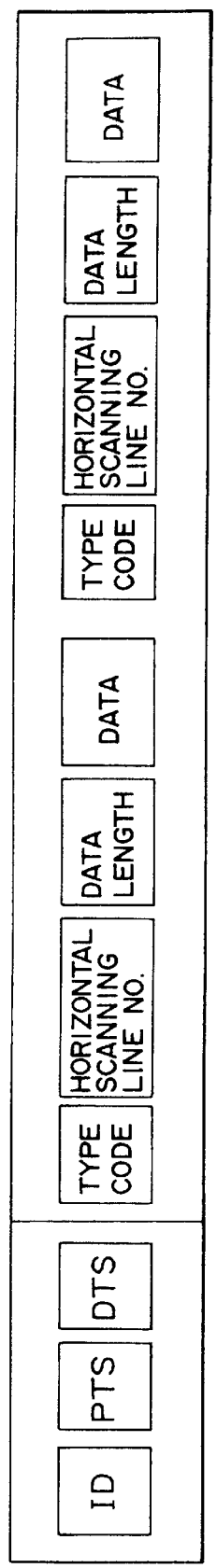
FIG. 4 shows another format for recording pattern data in the invention.

In the embodiment of FIG. 2, pattern data (character data) of one line (e.g., 21st H) is written per packet. However, it is also possible to write data of a plurality of lines per packet. FIG. 4 shows an exemplary embodiment representing such a case. In this example, type codes, horizontal scanning line numbers, data lengths and data of two lines having common PTS and DTS are recorded in an actual data region.

Figure 5:
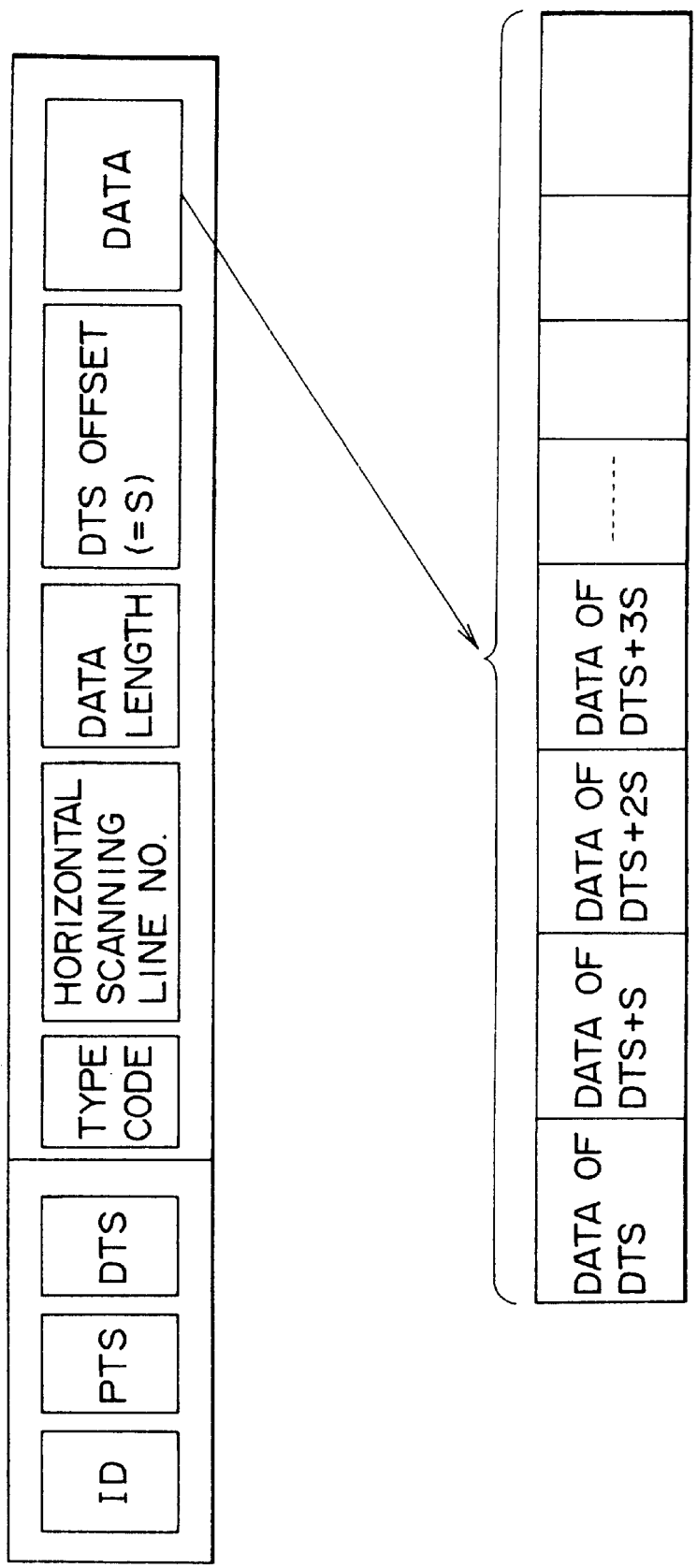
FIG. 5 shows a further format for recording pattern data in the invention.

It is further possible to make a modification adapted for writing, in a single packet, data of specified scanning line transmitted in succession over several frames (e.g., data of 21st H in several frames). FIG. 5 shows an exemplary embodiment representing such a case.

In the embodiment of FIG. 5, a DTS for a top character string is described in the DTS of a header. And since a plurality of pattern data are described as data in an actual data region, a DTS offset is disposed between the data length and the data in the actual data region. The data length in FIG. 5 signifies the length of the character string to be reproduced at each time, and the DTS offset signifies a temporal deviation with which each character string reproduced at a time is to be presented. Accordingly, character strings are presented successively from the top DTS at an interval specified by the DTS offset. In other words, the pattern data are arranged in the order of data presented at a timing of DTS, data presented at a timing of DTS+S, data presented at a timing of DTS+2S, data presented at a timing of DTS+3S and so forth.

According to the closed caption system adopted in the United States, merely two bytes are used per frame of image. Therefore, as shown in FIG. 2 for example where one packet is recorded for describing character data of two bytes per frame, a header (of several or more bytes) needs to be added per packet to consequently deteriorate the encoding efficiency. However, in the embodiment of FIG. 5 where many closed caption data are described collectively in a single packet, it is possible to enhance the encoding efficiency.

Referring now to FIG. 6, an explanation will be given on a data recorder where the data multiplexer of the present invention is applied.

A data recorder 1 in this embodiment is capable of multiplexing previously produced video data, audio data and caption data (synonymous with the aforementioned pattern data) or a combination of any of such data and, after affixing additional information (subcode) thereto, recording them on a data recording medium 19.

In this data recorder 1, a master data sender 2 sends, in response to a command from a controller 20, the previously produced video data, audio data and caption data respectively to a video encoder 5, an audio encoder 6 and a caption encoder 7. The master data sender 2 consists of, e.g., a video tape player for business use. When time code data is also existent with the video data, audio data and caption data, the master data sender 2 sends such time code data to a time code switching circuit 10.

In order to newly add caption data separately from the master data sender 2, the caption data obtained from an unshown caption generator may be supplied to the caption encoder 7.

The video data received from the master data sender 2 is encoded by the video encoder 5 in accordance with the procedure prescribed in the MPEG-2 video and then is supplied to a multiplexing circuit 8. There are also supplied, to a subcode encoder 11, entry point data indicating the position of an I-picture, picture header data indicating the position of a picture header, picture type data indicating the picture type (I-picture (intraframe code picture), P-picture (forward predictive code picture) or B-picture (bidirectional predictive code picture)), and temporary reference data inclusive of a recorded temporary reference number.

The audio data received from the master data sender 2 is then supplied from the audio encoder 6 to the multiplexing circuit 8 either directly without any processing or after being encoded in accordance with the procedure prescribed in the MPEG-2 audio.

The caption data received from the master data sender 2 is then supplied from the caption encoder 7 to the multiplexing circuit 8 either directly without any processing or through analog-to-digital conversion. There are also outputted, to the multiplexing circuit 8, the data relative the type code, horizontal scanning number and data length of the PES packet shown in FIGS. 2, 4 or 5.

A header generating circuit 4 receives input signals from the video encoder 5, the audio encoder 6 and the caption encoder 7, and supplies to the multiplexing circuit 8 the data corresponding to the ID, PTS and DTS of the header in the PES packet shown in FIGS. 2, 4 or 5.

The multiplexing circuit 8 multiplexes the data, which are supplied from the video encoder 5, the audio encoder 6 and the caption encoder 7, on the basis of the standard prescribed in the MPEG-2 system. In this stage of the operation, the multiplexing circuit 8 receives, from a controller 20, a signal relative to a unit of data readable from or writable on a data recording medium 19, i.e., the amount of user data corresponding to one sector, and multiplexes the data in such a manner that one packet is not astride the user data of a plurality of sectors, and then sends the multiplexed data to an ECC (Error Correction Code) encoder 15. And simultaneously therewith, the multiplexing circuit 8 also sends to the ECC encoder 15 a sector boundary signal which indicates a boundary between the sectors.

A time code data generator 9 generates time code data in response to a command from the controller 20. And a time code data switching circuit 10 selects either the time code data supplied from the master data sender 2 or the time code data supplied from the time code data generator 9, and sends the selected data to a subcode encoder 11. In this case, when there exists any time code data supplied from the master data sender 2, the circuit 10 selects that time code data, but when there is none of time code data supplied from the master data sender 2, the circuit 10 selects the time code data obtained from the time code data generator 9.

The subcode encoder 11 encodes sector number data received from the controller 20 and also other additional data into a predetermined format, and sends the encoded data to a CRC (Cyclic Redundancy Check) encoder 12. Here, the other additional data include copyright management data, time code data supplied from the time code data switching circuit 10, and entry point data, picture header data, picture type data and temporary reference data supplied from the video encoder 5.

The CRC encoder 12 calculates CRC of the subcode data received from the subcode encoder 11, then adds CRC data to the subcode data and sends the same to a sync pattern adding circuit 13. Subsequently the circuit 13 adds a sync pattern to the input data and sends the same to a subcode buffer 14.

The ECC encoder 15 calculates parity bits of ECC counted according to the Reed-Solomon code, then adds the result to the multiplexed data supplied from the multiplexing circuit 8, and sends the ECC-added data to a subcode adding circuit 16. Meanwhile the ECC encoder 15 receives a sector boundary signal from the multiplexing circuit 8 and sends the sector boundary signal to the subcode adding circuit 16 in a manner to correspond to the boundary between the sectors of the ECC-added data.

The subcode adding circuit 16 inserts the subcode data, which has been read out from a subcode buffer 14, at the inter-sector boundary in the data sent from the ECC encoder 15, on the basis of the sector boundary signal outputted from the ECC encoder 15. Further the subcode adding circuit 16 supplies to a modulating circuit 17 the data obtained by insertion of the subcode data. The modulating circuit 17 serves to modulate the output data of the subcode adding circuit 16 for achieving a predetermined signal format recordable on the data recording medium 19, and this circuit performs EFM (Eight to Fourteen Modulation) for example. A write device 18 records the output signal of the modulating circuit 17 on the data recording medium 19 electrically, magnetically, optically or physically. In this embodiment, the data recording medium 19 is a disk (digital video disk).

Hereinafter an explanation will be given on the operation performed in the embodiment of FIG. 6. First, in response to an edit command obtained from a user, the controller 20 outputs a data send command to the master data sender 2. Further the controller 20 transmits to the multiplexing circuit 8 an instruction indicative of the sector size, then generates sector number data and copyright management data to be recorded as subcode, and supplies the generated data to the subcode encoder 11. And when none of time code data is sent from the master data sender 2, the controller 20 instructs the time code generator 9 to generate time code data in response to a command from the user.

The video encoder 5 encodes the input video signal in accordance with the MPEG-2 video. In this case, as described earlier, the video encoder 5 encodes the data of effective lines from the 22nd to 261st H in an odd field and the data of effective lines from the 285th to 524th H in an even field. Thereafter the video encoder 5 supplies, to the subcode encoder 11, picture type data representing the type of the encoded picture (I-picture, P-picture or B-picture) and the temporary reference number. In the case of sending a picture header, data signifying the existence of the picture header, i.e., picture header data, is sent to the subcode encoder 11; whereas in the case of further sending an I-picture, data signifying the existence of the I-picture, i.e., entry point data, is sent to the subcode encoder 11.

The audio encoder 6 and the caption encoder 7 encode the audio signal and the caption signal inputted thereto respectively and then send the encoded signals to the multiplexing circuit 8. The caption encoder 7 further outputs the data, which represent the type code, the horizontal scanning line number and the data length of the pattern data, to the multiplexing circuit 8. Subsequently the multiplexing circuit 8 adds the output data of the header generating circuit 4 as a header to each of the data supplied respectively from the video encoder 5, the audio encoder 6 and the caption encoder 7, and then forms such data into PES packets to thereby multiplex the same in conformity to the prescription of the MPEG-2 system.

Figure 7:
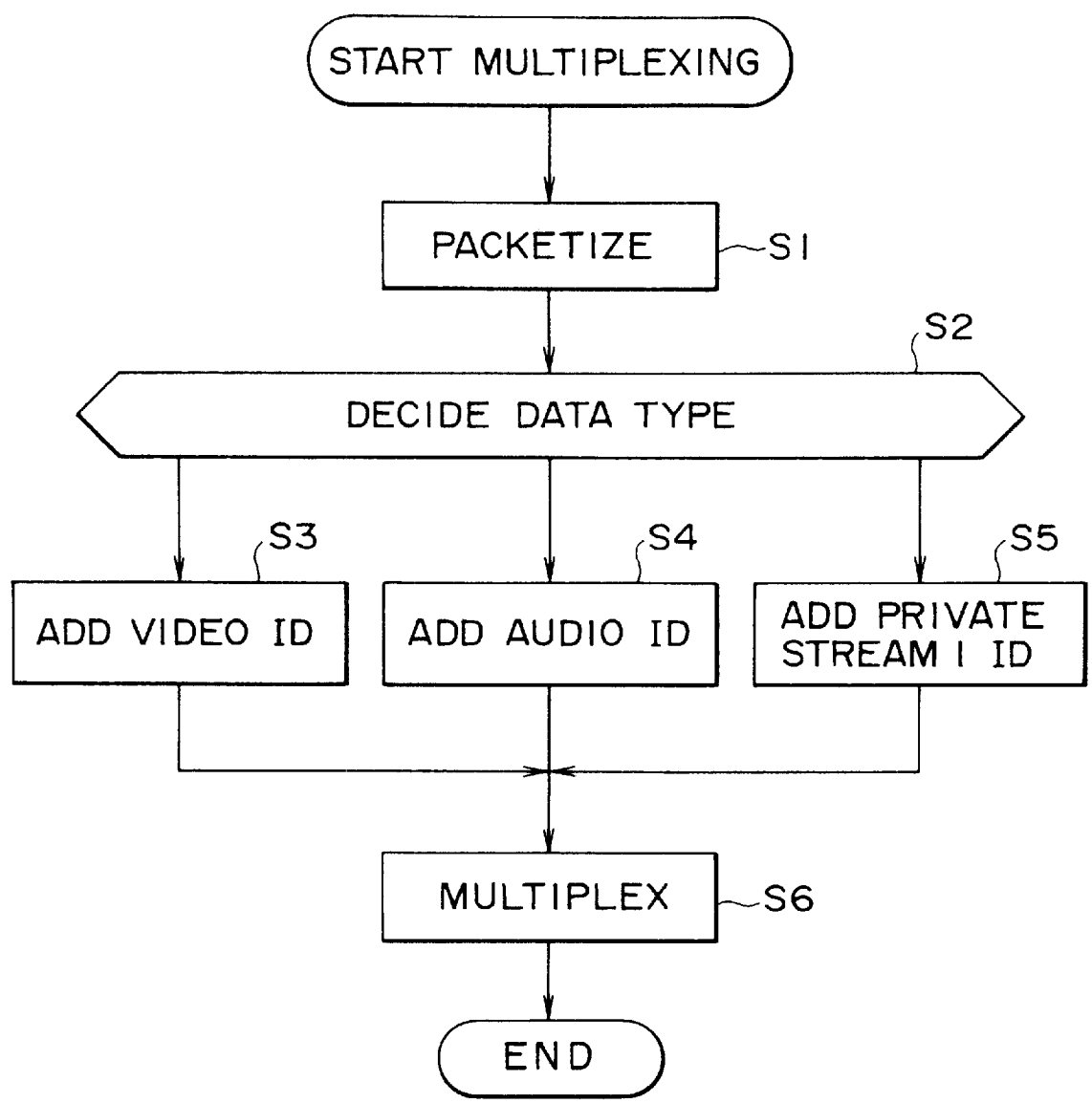
FIG. 7 is a flow chart for explaining the processing executed by a multiplexing circuit in FIG. 6.

FIG. 7 shows an exemplary multiplexing process executed in the multiplexing circuit 8. Initially at step S1, as shown in this chart, the data inputted from the video encoder 5, the audio encoder 6 or the caption encoder 7 is packetized to form PES packets. In each video packet or audio packet, the encoded video data or audio data is described in a actual data region thereof. However, in each pattern data packet, there are also described a type code, a horizontal scanning line number and a data length in addition to the pattern data, as shown in FIGS. 2, 4 or 5.

Subsequently at step S2, a decision is made with regard to the type of the data, and if the result of this decision signifies the video data inputted from the video encoder 5, the operation proceeds to step S3, where 1110xxxx representing the video data is described as an ID of the packet header. In this case, a preset value is used for xxxx. Further, PTS and DTS of the video data are also added to the header.

If the result of the above decision at step S2 signifies the audio data inputted from the audio encoder 6, the operation proceeds to step S4 where 110xxxxx is added as an ID of the packet header, so that this packet is represented as an audio data packet. Further, PTS and DTS of the audio data are also added to the header.

Meanwhile, in case the result of the decision at step S2 signifies the caption data (pattern data) inputted from the caption encoder 7, the operation proceeds to step S5, where 10111101 corresponding to an ID of a private stream type 1 is added as an ID of the packet header, so that this packet is represented as one including the caption data. Further, PTS and DTS of the pattern data are also added to the header.

After termination of the processing at steps S3 to S5, the operation proceeds to step S6, where the packets each having the corresponding ID added thereto are time-division multiplexed and are outputted as a stream.

The user data packetized per sector in the multiplexing circuit 8 is sent to the ECC encoder 15. Then the ECC encoder 15 calculates the ECC of the received user data and, after addition of the ECC immediately posterior to the user data, sends the same to the subcode adding circuit 16.

The multiplexing circuit 8 further outputs to the ECC encoder 15 a sector boundary signal which becomes 1 only in the case of sending the top byte of the user data, i.e., the sector boundary but becomes 0 in any other case. Subsequently the ECC encoder 15 holds the sector boundary signal thus received and, when outputting the data to the subcode adding circuit 16, sends thereto a sector boundary signal which becomes 1 only in the case of sending the top byte of the user data but becomes 0 in any other case.

Meanwhile the subcode encoder 11 composes a subcode by a combination of the sector number and the time code included in the input data, or by a combination of the sector number and the entry point data, or the sector number and the picture header data, or the sector number and the temporary reference, or the sector number and the copyright management data, and then outputs the subcode to the CRC encoder 12. Subsequently the CRC encoder 12 calculates the CRC of the subcode data supplied from the subcode encoder 11 and, after addition of the CRC immediately posterior to the subcode data, sends the same to the sync pattern adding circuit 13.

The sync pattern adding circuit 13 adds a sync pattern immediately anterior to the input subcode data with the CRC added thereto, and sends the processed subcode data to the subcode buffer 14. Then the subcode buffer 14 holds the input data composed of the successive sync pattern, subcode data and CRC, and sends the same to the subcode adding circuit 16 in response to a request from the circuit 16.

On the basis of the sector boundary signal received from the ECC encoder 15, the subcode adding circuit 16 requests the subcode buffer 14 to send the corresponding data of the successive sync pattern, subcode data and CRC, then inserts such data immediately anterior to the data-received from the ECC encoder 15 and composed of the successive user data and ECC, and supplies the processed data to the modulating circuit 17. Subsequently the modulating circuit 17 modulates the data received from the subcode adding circuit 16 and sends the modulated data to the write device 18, which then records the input data on the data recording medium 19.

According to the constitution mentioned above, in parallel with the process of recording, at a variable rate, each unitary sector of video data, audio data, caption data or a selective combination thereof, some additional data such as time code, entry point data, picture header data, temporary reference data or copyright management data can be generated and added as subcode to each sector, whereby it is rendered possible to realize a data recorder of a simplified structure which is capable of providing useful data to a data reproducer.

Figure 8B:
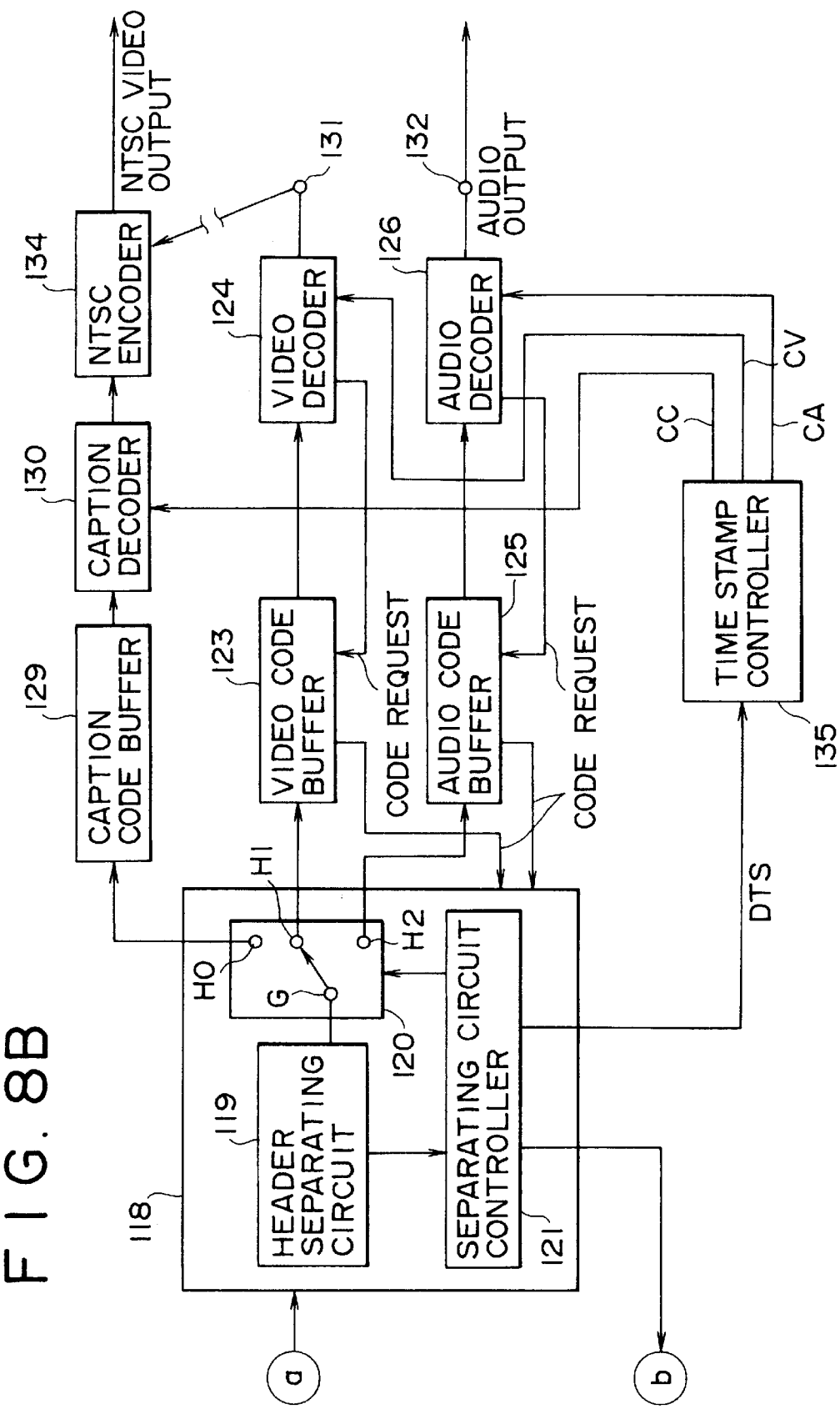
FIG. 8 is a block diagram showing an exemplary constitution of a data reproducer where a data demultiplexer of the invention is applied.
Figure 9A:
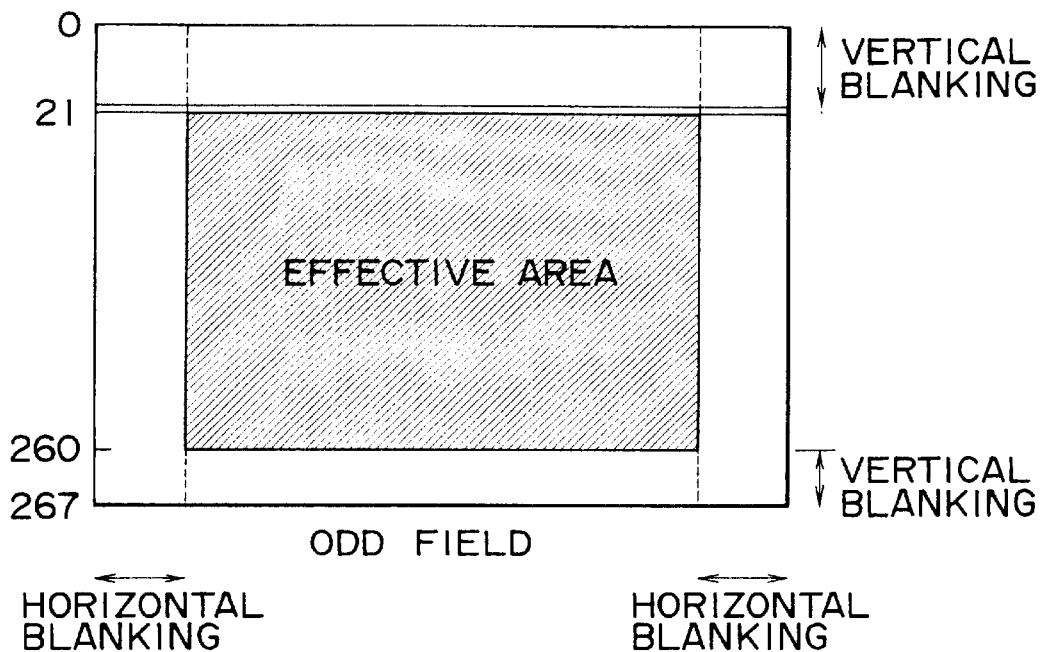
FIGS. 9A and 9B are schematic diagrams each for explaining an effective area.
Figure 9B:
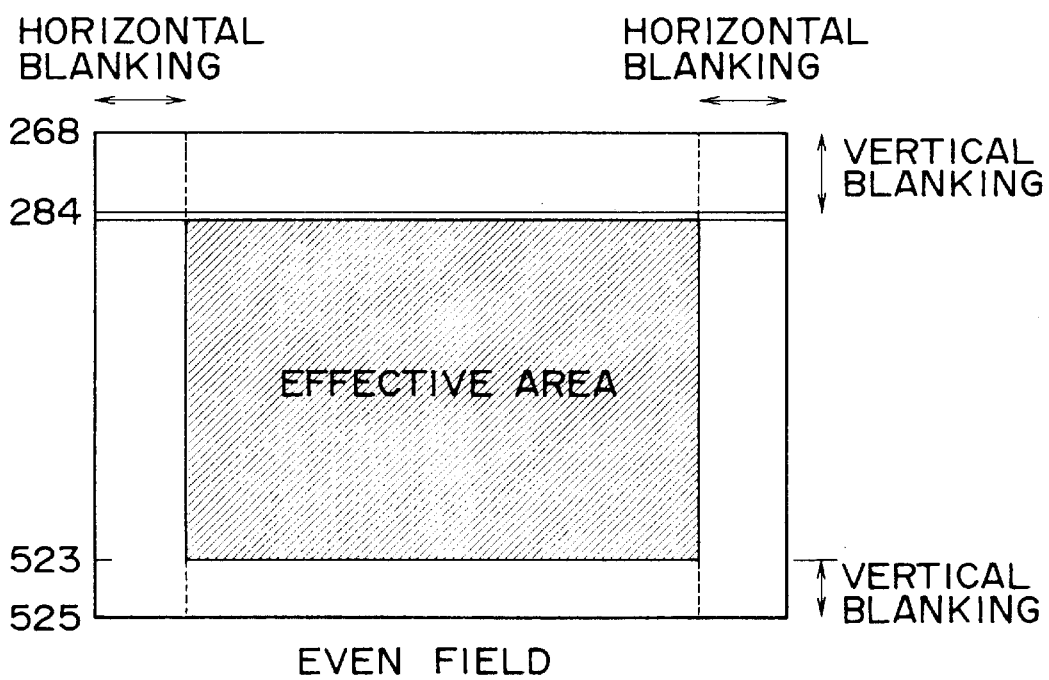
Figure 10:
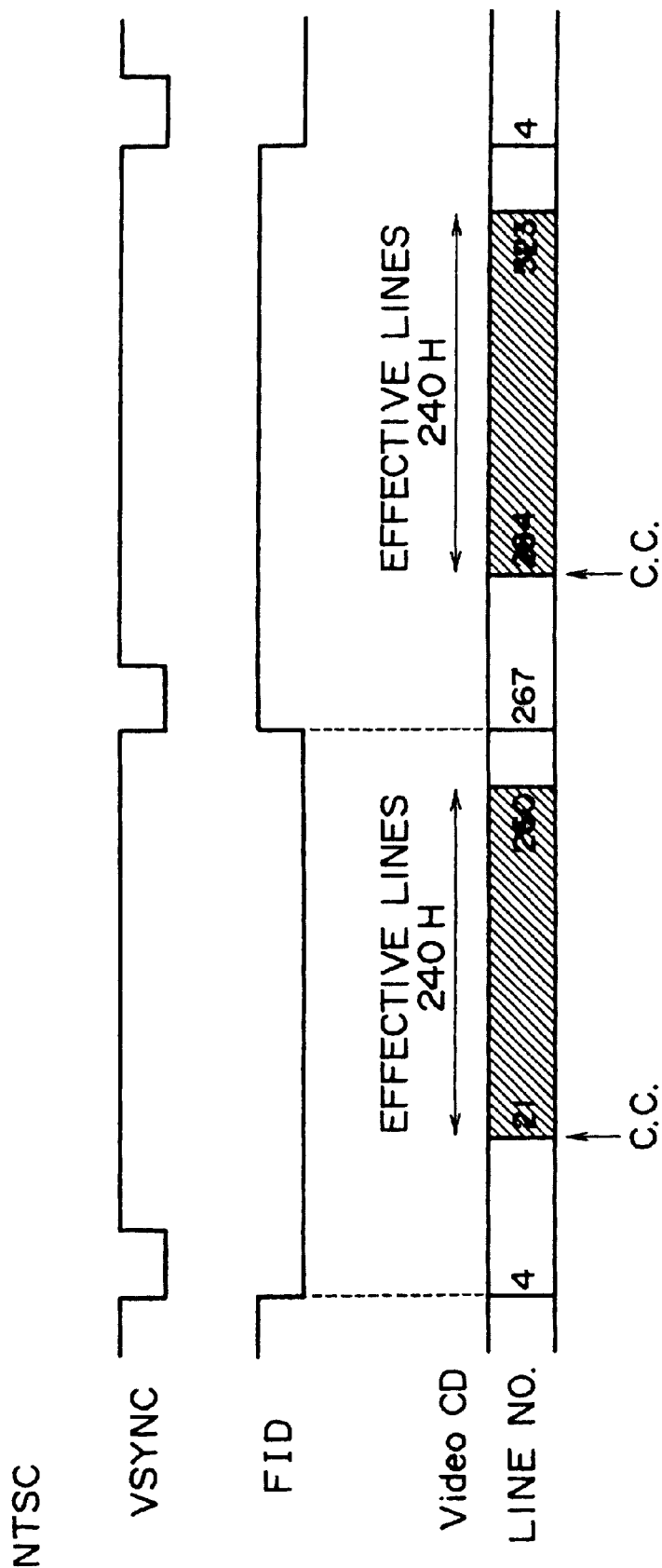
FIG. 10 is a schematic diagram for explaining effective lines in the prior art.
Figure 11:
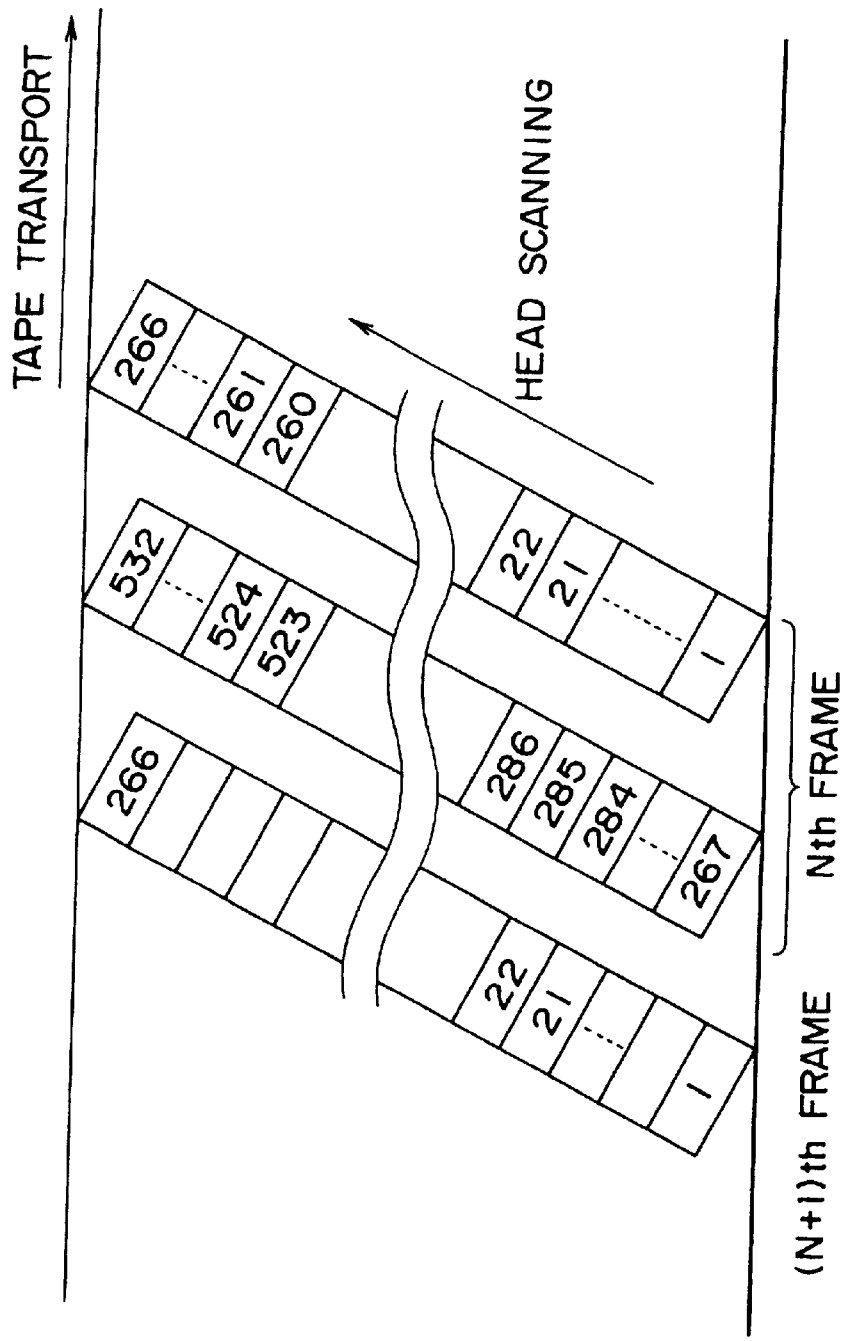
FIG. 11 shows a recording format on a magnetic tape used in a conventional video tape recorder.

Referring now to FIG. 8, an explanation will be given on a data reproducer which performs playback of the data recording medium 19 where the caption data is recorded in the manner described. The data reproducer of FIG. 8 is constructed by applying the data demultiplexer of the present invention.

In the data reproducer 100 of FIG. 8, the data recorded on the data recording medium 19 is reproduced by a pickup 112. This pickup 112 irradiates a laser light beam to the data recording medium 19 and reproduces the recorded data out of the reflected beam obtained from the data recording medium 19. The signal reproduced by the pickup 112 is supplied to a demodulating circuit 113, which then demodulates the reproduced signal outputted from the pickup 112 and supplies the demodulated signal to a sector detecting circuit 114.

Subsequently the sector detecting circuit 114 detects from the supplied data a sector address SAd recorded in each sector and then supplies the detected sector address SAd to a ring buffer control circuit 116. The sector detecting circuit 114 also outputs the data in a sector-synchronized state to an ECC circuit 115 in the following stage. When no address is detected at all or the detected addresses are not consecutive for example, the sector detecting circuit 114 further outputs a sector number abnormal signal via the ring buffer control circuit 116 to a track jump decision circuit 128.

The ECC circuit 115 detects any error in the data supplied from the sector detecting circuit 114 and, after correction of the error by the use of redundancy bits added to the data, outputs the corrected data to a ring buffer memory (FIFO) 117 for track jump. In case the data error is not correctable, the ECC circuit 115 further outputs an error generation signal to the track jump decision circuit 128.

The ring buffer control circuit 116 controls writing and reading in the ring buffer memory 117 and supervises a code request signal sent for requesting the output data of a data demultiplexing circuit 118.

The track jump decision circuit 128 monitors the output of the ring buffer control circuit 116 and, when a track jump is necessary, outputs a track jump signal to a tracking servo circuit 127, thereby causing the pickup 112 to jump to a desired playback position on the disk 19. Further the track jump decision circuit 128 detects either a sector number abnormal signal from the sector detecting circuit 114 or an error generation signal from the ECC circuit 115 and then outputs a track jump signal to the tracking servo circuit 127, thereby causing the pickup 112 to jump to a desired playback position.

The data output from the ring buffer memory 117 is supplied to a data demultiplexing circuit 118. A header separating circuit 119 incorporated in the data demultiplexing circuit 118 separates the packet header from the data supplied from the ring buffer memory 117 and then supplies the packet header to a demultiplexing circuit controller 121 while supplying the time-division multiplexed data to an input terminal G of a switching circuit 120.

Output terminals (switched terminals) H0, H1 and H2 of the switching circuit 120 are connected respectively to input terminals of a caption code buffer 129, a video code buffer 123 and an audio code buffer 125. Further the output of the caption code buffer 129 is connected to the input of the caption decoder 130, the output of the video code buffer 123 to the input of the video decoder 124, and the output of the audio code buffer 125 to the input of the audio decoder 126, respectively.

A code request signal generated by the video decoder 124 is inputted to the video code buffer 123, and a code request signal generated by the video code buffer 123 is inputted to the data demultiplexing circuit 118. As described earlier, the video data decoded in the video decoder 124 is based on the aforementioned MPEG-2 standard, and pictures according to three types of different encoding methods, such as I-picture, P-picture and B-picture, are formed into a predetermined GOP (Group of Pictures).

Similarly, a code request signal generated by the audio decoder 126 is inputted to the audio code buffer 125, and a code request signal generated by the audio code buffer 125 is inputted to the data demultiplexing circuit 118. The audio data decoded in the audio decoder 126 is also based on the MPEG-2 standard or is uncompressed digital audio data.

The video data is converted by an NTSC encoder 134 into an analog TV signal of the NTSC standard. In the NTSC encoder 134, the caption data supplied from the caption decoder 130 is superimposed on the vertical blanking interval at the position specified on the bit stream (by the horizontal scanning number in FIGS. 2, 4 or 5).

A time stamp controller 135 controls the decoding synchronism of the decoders 124, 126 and 130 in response to an input time stamp DTS separated from the packet header by the demultiplexing circuit controller 121.

The operation of the above data reproducer 100 will now be described below. The pickup 112 irradiates a laser light beam onto the data recording medium 19 and reproduces, from the reflected light beam, the data recorded in the data recording medium 19. Thereafter the reproduced signal from the pickup 112 is inputted to the demodulating circuit 113 to be demodulated therein. The demodulated data obtained from the demodulating circuit 113 is inputted via the sector detecting circuit 114 to the ECC circuit 115, where error detection and correction are performed. In case the sector number (address allocated to the sector of the data recording medium 19) fails to be detected properly in the sector detecting circuit 114, a sector number abnormal signal is outputted to the track jump decision circuit 128. Upon generation of any uncorrectable data, the ECC circuit 115 outputs an error generation signal to the track jump decision circuit 128. And the error-corrected data is supplied from the ECC circuit 115 to the ring buffer memory 117 and then is stored therein.

The output (sector address SAd) of the sector detecting circuit 114 is supplied to the ring buffer controller 116. Then the ring buffer controller 116 specifies a write address (write pointer WP) on the ring buffer memory 117 corresponding to the sector address SAd.

In response to a code request signal outputted from the data demultiplexing circuit 118 in the following stage, the ring buffer controller 116 further specifies a read address (read pointer RP) of the data written in the ring buffer memory 117, then reads out the data from the read pointer (RP) and supplies the read data to the data demultiplexing circuit 118.

The header separating circuit 119 in the data demultiplexing circuit 118 separates the pack header from the data supplied from the ring buffer memory 117 and supplies the separated pack header to the demultiplexing circuit controller 121. Subsequently this controller 121 connects the input terminal G of the switching circuit 120 sequentially to the output terminals (switched terminals) H0, H1 and H2 in accordance with the stream id data of the packet header supplied from the head separating circuit 119, thereby demultiplexing the time-division multiplexed data properly, and then supplies the demultiplexed data to the corresponding code buffer.

Depending on the residual capacity of the internal code buffer, the video code buffer 123 generates a code request to the data multiplexing circuit 118, and stores the data received correspondingly to this request. Further the video code buffer 123 accepts a code request from the video decoder 124 and outputs the internal data.

Thereafter the video decoder 124 decodes the supplied video data to thereby reproduce the video signal and then delivers the same from the output terminal 131.

Depending on the residual capacity of the internal code buffer, the audio code buffer 125 generates a code request to the data multiplexing circuit 118, and stores the data received correspondingly to this request. Further the audio code buffer 125 accepts a code request from the audio decoder 126 and outputs the internal data. Thereafter the audio decoder 126 decodes the supplied audio data to thereby reproduce the audio signal and then delivers the same from the output terminal 132.

Thus, the video decoder 124 requests the video code buffer 123 to send the data, then the video code buffer 123 requests the data demultiplexing circuit 118 to send the data, and the data demultiplexing circuit 118 requests the ring buffer controller 116 to send the data, whereby the data is read from the ring buffer memory 117 and is transferred in a direction reverse to the requests.

In case the amount of the data read from the ring buffer memory 117 is small, there may occur a phenomenon that the amount of the data stored in the ring buffer memory 117 is increased to consequently cause overflow. Therefore the track jump decision circuit 128 supervises both the write pointer (WP) and the read pointer (RP) and, when there exists a possibility of overflow of the ring buffer memory 117, outputs a track jump command to the tracking servo circuit 127.

Upon detection of a sector number abnormal signal from the sector detecting circuit 114 or an error generation signal from the ECC circuit 115, the track jump decision circuit 128 outputs a track jump command to the tracking servo circuit 127 for enabling the pickup 112 to reproduce the data again at the error-generated position.

In response to the track jump command outputted from the track jump decision circuit 128, the tracking servo circuit 127 causes the pickup 112 to jump from the present playback position to a desired position. And during this period of time, the data already stored in the ring buffer memory 117 is transferred to the data demultiplexing circuit 118 so that the data is not interrupted.

The video data is converted by the NTSC encoder 134 into a video signal of the NTSC system. Here, the caption data is superimposed on the NTSC video signal by the NTSC encoder 134 in such a manner as to be positioned on the 21st H in the closed caption system adopted in the United States, or on the 21st and 284th H in the EDS. When pattern data is composed of a mosaic pattern as in the CAPTAIN system, although unshown, a pattern corresponding to the caption data is previously stored in a ROM and is read out therefrom.

The video data, audio data and caption data encoded by a variable rate method are mutually different in amount per unit time. Accordingly, the time stamp controller 135 outputs control signals CV, CA and CC respectively to the decoders with reference to the DTS added to the PES packet, thereby controlling the individual decoding timing synchronously.

In the above embodiment, both video and audio data are encoded according to the MPEG-2 system. However, it is also possible to encode the video data according to the MPEG-1 video standard, or to encode the audio data according to the MPEG-1 audio standard, the standard of ATRAC (Adaptive Transform Acoustic Coding (trade name)) for MD (Mini Disc (trade name)), or the standard of AC-3 (trade name of U.S. Dolby Lab.), or to multiplex the data according to the standard of the MPEG-1 system.

As for the data recording medium 19 mentioned, any of recordable disks may be used, such as a magnetic disk, an optical disk, a magneto-optical disk or a phase change disk. Although information inclusive of sector synchronizing signals, sector addresses and so forth may be recorded at the time of initialization, a preformatted disk is usable as well. In a recording mode, data are recorded at predetermined positions by using such information.

Thus, according to the data multiplexer and the data demultiplexing method of the present invention, digital moving picture data and pattern data are packetized in a predetermined format, and a flag for identifying the moving picture data and the pattern data is added to a header of each packet. Therefore the pattern data to be inserted on an arbitrary horizontal scanning line can be multiplexed with the moving picture data.

According to the data recorder and the data recording medium of the present invention, the moving picture data and the pattern data packetized in a predetermined format are recorded on the digital recording medium with addition of a flag for identifying such data. Therefore the pattern data to be inserted on an arbitrary horizontal scanning line can be multiplexed and recorded with the moving picture data.

And according to the data demultiplexer and the data demultiplexing method of the present invention, the digital moving picture data and the pattern data are separated from each other on the basis of the detected flag. Consequently it becomes possible to decode and display the digital moving picture data and the pattern data with certainty.

Although the present invention has been described hereinabove with reference to some preferred embodiments thereof, it is to be understood that the invention is not limited to such embodiments alone, and a variety of other modifications and variations will be apparent to those skilled in the art without departing from the spirit of the invention.

The scope of the invention, therefore, is to be determined solely by the appended claims.

What is claimed is:

1. A data recording apparatus, comprising:
   means for providing moving picture data including picture data corresponding to an effective display area of a predetermined analog television standard;
   means for providing pattern data including data corresponding to actual data for a plurality of pictures frames, decoding time stamp (DTS) offset data representative of temporal interval between the actual data of adjacent ones of said picture frames, a data length and pattern data type; and
   means for recording said moving picture data and said pattern data on a recording medium separately multiplexed.

2. A data recording method, comprising the steps of:
   providing moving picture data including picture data corresponding to an effective display area of a predetermined analog television standard;
   providing pattern data including data corresponding to actual data for a plurality of pictures frames, decoding time stamp (DTS) offset data representative of temporal interval between the actual data of adjacent ones of said picture frames, a data length and pattern data type; and
   recording said moving picture data and said pattern data on a recording medium separately multiplexed.

3. A data recording medium usable with a reproducing apparatus having recorded therein at least moving picture data and pattern data including data corresponding to actual data for a plurality of pictures frames, decoding time stamp (DTS) offset data representative of temporal interval between the actual data of adjacent ones of said picture frames, a data length and pattern data type readable by a reproducing apparatus, in which the moving picture data includes picture data corresponding to an effective display area of a predetermined analog television standard, wherein during a reproduction operation performed by said reproducing apparatus the actual data is reproduced in accordance with said DTS offset data and superimposed with a signal obtained from the moving picture data.

4. A data reproducing apparatus, comprising:
   means for reproducing moving picture data and pattern data including data corresponding to actual data for a plurality of pictures frames, decoding time stamp (DTS) offset data representative of temporal interval between the actual data of adjacent ones of said picture frames, a data length and pattern data type on a recording medium, in which the moving picture data includes picture data corresponding to an effective display area of a predetermined analog television standard;
   means for converting said moving picture data into a video signal; and
   means for reproducing the actual data in succession over the plurality of pictures frames in accordance with said DTS offset data and superimposing the same with said video signal.

5. A data reproducing method comprising the steps of:
   reproducing moving picture data and pattern data including data corresponding to actual data for a plurality of pictures frames, decoding time stamp (DTS) offset data representative of temporal interval between the actual data of adjacent ones of said picture frames, a data length and pattern data type on a recording medium, in which the moving picture data includes picture data corresponding to an effective display area of a predetermined analog television standard;
   converting said moving picture data into a video signal; and
   reproducing the actual data in succession over the plurality of picture frames in accordance with said DTS offset data and superimposing the same with said video signal.

* * * * *